United States Patent
Van Till (10) Patent No.: US 11,222,494 B2
(45) Date of Patent: Jan. 11, 2022

(54) INDEXING A VIDEO SURVEILLANCE STREAM TO MATCH AN ACCESS CONTROL CREDENTIAL OR TOKEN WITH BEST FACIAL IMAGE DETECTED AT A SECURITY PORTAL METHOD OF OPERATION AND SYSTEM

(71) Applicant: Steven Van Till, Bethesda, MD (US)

(72) Inventor: Steven Van Till, Bethesda, MD (US)

(*) Notice: Subject to any disclaimer, the term of this patent is extended or adjusted under 35 U.S.C. 154(b) by 374 days.

(21) Appl. No.: 16/442,629

(22) Filed: Jun. 17, 2019

(65) Prior Publication Data
US 2020/0394855 A1    Dec. 17, 2020

(51) Int. Cl.
*G06K 9/00*   (2006.01)
*G07C 9/25*   (2020.01)
*G07C 9/27*   (2020.01)

(52) U.S. Cl.
CPC ......... *G07C 9/257* (2020.01); *G06K 9/00288* (2013.01); *G06K 9/00771* (2013.01); *G07C 9/27* (2020.01)

(58) Field of Classification Search
CPC ........... G06K 9/00288; G06K 9/00771; G07C 9/253; G07C 9/257; G07C 9/27
See application file for complete search history.

(56) References Cited

U.S. PATENT DOCUMENTS

2020/0082135 A1*  3/2020  Tagawa ................ G06K 7/1417

FOREIGN PATENT DOCUMENTS

EP           3229174      * 10/2017   ......... G06F 16/7844

* cited by examiner

*Primary Examiner* — Tom Y Lu
(74) *Attorney, Agent, or Firm* — Patentry; Peter G. H. Hwang (57) ABSTRACT

Video still frames with highest facial detection scores are matched and displayed to a security operator console with identity indicia retrieved upon a credential submission event from a physical access control system. An apparatus couples a security operator console to a surveillance camera at a physical access control portal. A video clip containing a frame with highest facial detection score of all frames captured in propinquity to the time of credential submission, is matched to and displayed with the identity indicia. Credentials from a group of people entering together are presented to a security officer console along with video clips simultaneously containing a plurality of faces or perspectives which may be accepted en masse or in part. Time shifting still frames to reconcile with credential submission time stamps concentrates content in a display console. The apparatus retrieves and presents identity indicia in conjunction with a face in the selected frame.

3 Claims, 9 Drawing Sheets

INDEXING A VIDEO SURVEILLANCE STREAM TO MATCH AN ACCESS CONTROL CREDENTIAL OR TOKEN WITH BEST FACIAL IMAGE DETECTED AT A SECURITY PORTAL METHOD OF OPERATION AND SYSTEM

CROSS-REFERENCE TO RELATED APPLICATIONS

Not Applicable

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to physical access control systems such as electronic readers, door strikes, and similar apparatus, along with video surveillance equipment such as network cameras and video management systems.

Description of the Related Art

Cipher locks, card keys, and mobile devices are used to credentialize authorized users at electronically controlled doors. Generally, these must be presented to a reader or sensor next to the door. Separately, security operators view video images of the bearers of said mobile credentials to see if they resemble the person to whom the credential was issued.

As is known, there are two primary applications of machine learning that analyze images containing faces: facial detection and facial recognition. A facial detection system is designed to answer the question: is there a face in this picture? A facial detection system determines the presence, location, scale, and (possibly) orientation of any face present in a still image or video frame. This system is designed to detect the presence of faces regardless of attributes of the person such as gender, age, or facial hair, or of any personal accoutrements such as eyeglasses, hats, or other articles of clothing. A facial detection system can provide an estimate of the confidence level of the prediction in the form of a probability or confidence score. For example, a facial detection system may predict that an image region is a face at a confidence score of 90%, and another image region is a face at a confidence score of 60%. The region with the higher confidence score should be more likely to contain a face. Confidence scores are a conventional component of facial detection systems. These systems make predictions of whether a face exists in an image, with a corresponding level of confidence in the prediction.

As is known, conventional physical access control systems have one or both of credential verification systems and video surveillance security systems. Watching a stream of visitors transiting a portal is both boring and time-consuming. What is needed is a method for providing a security operator console with a single best surveillance camera frame for one of a plurality of electronic credentials scanned within a range of time and minimization of user time searching through a video stream.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Within this application we define and use a video clip to refer to at least one best quality frame (qframe) and optionally one or more leading frames (lframes) and one or more succeeding frame (sframes) which cluster about a stream time stamp of the qframe. It can be appreciated that a video stream contains a discrete but continuous series of time stamps each associated with a frame. The object of the invention is to retrieve identity indicia and transform a stream of video surveillance images into video clips which are first matched and secondly displayed together on a console to a security operator for acceptance or rejection.

Video still frames with the highest facial detection scores are matched and displayed to a security operator console with identity indicia retrieved upon a credential event. A video surveillance stream can be regarded as a continuous sequence of still frames at discrete time stamps. These may be encoded and decoded in various schemes for compression and transmission efficiency but any single frame can be reconstructed as a human recognizable still image by known methods (e.g. jPEG, H.264 without limitation).

When a credential bearer submits an electronic credential to transit a portal, identity indicia is retrieved and presented to a security officer console.

A video clip containing one or more frames with highest facial detection score of all frames captured in propinquity to the time of credential submission, is matched to and displayed with the identity indicia.

Credentials from a group of people entering together are presented to a security officer console along with a video clip simultaneously containing a plurality of faces or perspectives which may be accepted en masse or in part. Rather than forming single files to pass through a portal, groups of individuals, each bearing his or her own credential may transit a lobby or hallway with remote sensors capable of reading an electronic credential within a volume of space. The apparatus matches many credentials to many faces.

Because the submission of an electronic credential may involve holding a device in the vicinity of a credential reading device (reader), a video surveillance camera may not capture the best quality face at that instant of time. The highest score for confidence level of finding a face may be in a frame captured earlier or later than the timestamp of credential submission via a reader. Thus, frames both earlier and later than the time of credential read (access control event) or time of transiting the portal may provide better visualization for a security officer. Time shifting still frames to reconcile with credential submission time stamps increases productivity of a display console user.

An apparatus is coupled to a security operator console to display images captured by a surveillance camera at a physical access control portal. An electronic credential sensor device (reader) is coupled to an identity database which is further coupled to said console. A plurality of electronic credentials is received by said reader in proximity to said portal within a range of time within which a stream of images is captured. This application discloses an embodiment of the invention, a method that selects frames from the video stream which upon conventional facial determination analysis receive a score of highest confidence of containing at least one face and crops said frame to isolate each potential face. The method retrieves identity indicia from the identity database and presents said identity indicia in conjunction with at least one cropped face in the selected frame.

The claimed invention includes means and methods for providing a security operator console with the single best quality facial image captured by surveillance camera for each electronic credential received at a portal.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Within this application, we define and use a video clip to refer to at least one best quality frame (qframe) and optionally one or more leading frame(s) (lframes) and one or more succeeding frame(s) (sframes) which cluster about a stream time stamp of the qframe. It can be appreciated that a video stream contains a discrete but continuous series of time stamps each associated with a frame. The object of the invention is to retrieve identity indicia and transform a stream of video surveillance images into video clips which are first matched and secondly displayed together on a console to a security operator for acceptance or rejection.

Figure 2:
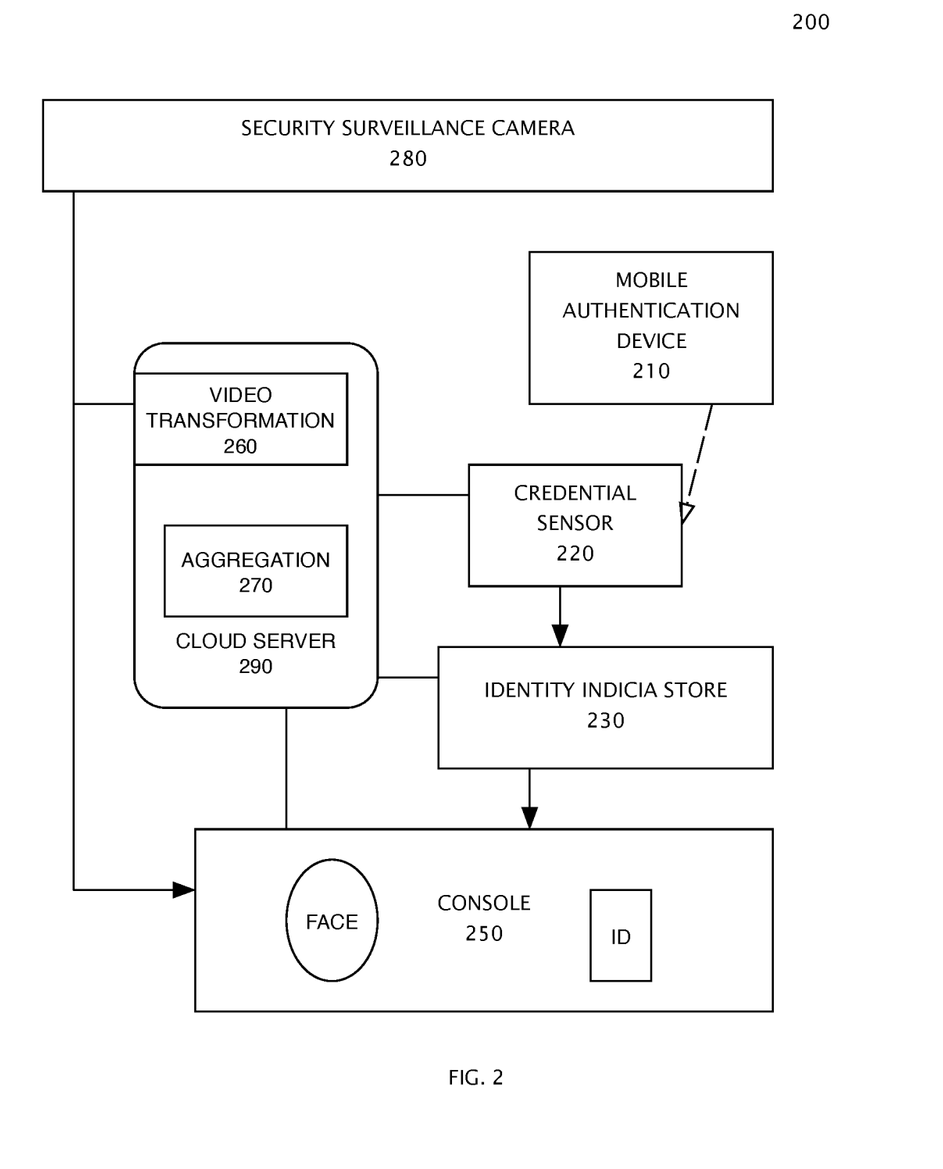
FIG. 2 is a block diagram of a system embodiment that connects cameras and credential sensors to a security console.

Referring now to FIG. 2, an illustration of a system embodiment of the invention includes: a console 250 communicatively coupled to an identity indicia 230 store and to a security surveillance camera 280; a credential sensor 220 communicatively coupled to the identity indicia store 230 and to a mobile authentication device 210 (non-limiting exemplary devices such as key, card, dongle, fob, watch, phone, badge); a cloud server 290 to perform as a transformation apparatus 260 of a video stream, to retrieve identity indicia based on the credential, and as an aggregation apparatus 270 to time shift and compile the best quality face frame and identity indicia for display on the console. The transformation apparatus determines the best quality face frame and assembles a video clip. The aggregation apparatus determines which video clip is matched with which credential submittal. The cloud server communicatively coupled to all components as well as non-transitory media containing data and instructions. In other words, an apparatus is coupled to a security operator console to display images captured by a surveillance camera at a physical access control portal. An electronic credential sensor is coupled to an identity database which is further coupled to said console. The system includes data and instructions to cause distributed processors within these apparatuses to perform the claimed method steps. This diagram provides one illustrative enablement for clarity of exposition but is not to be construed as limiting the invention.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 3:
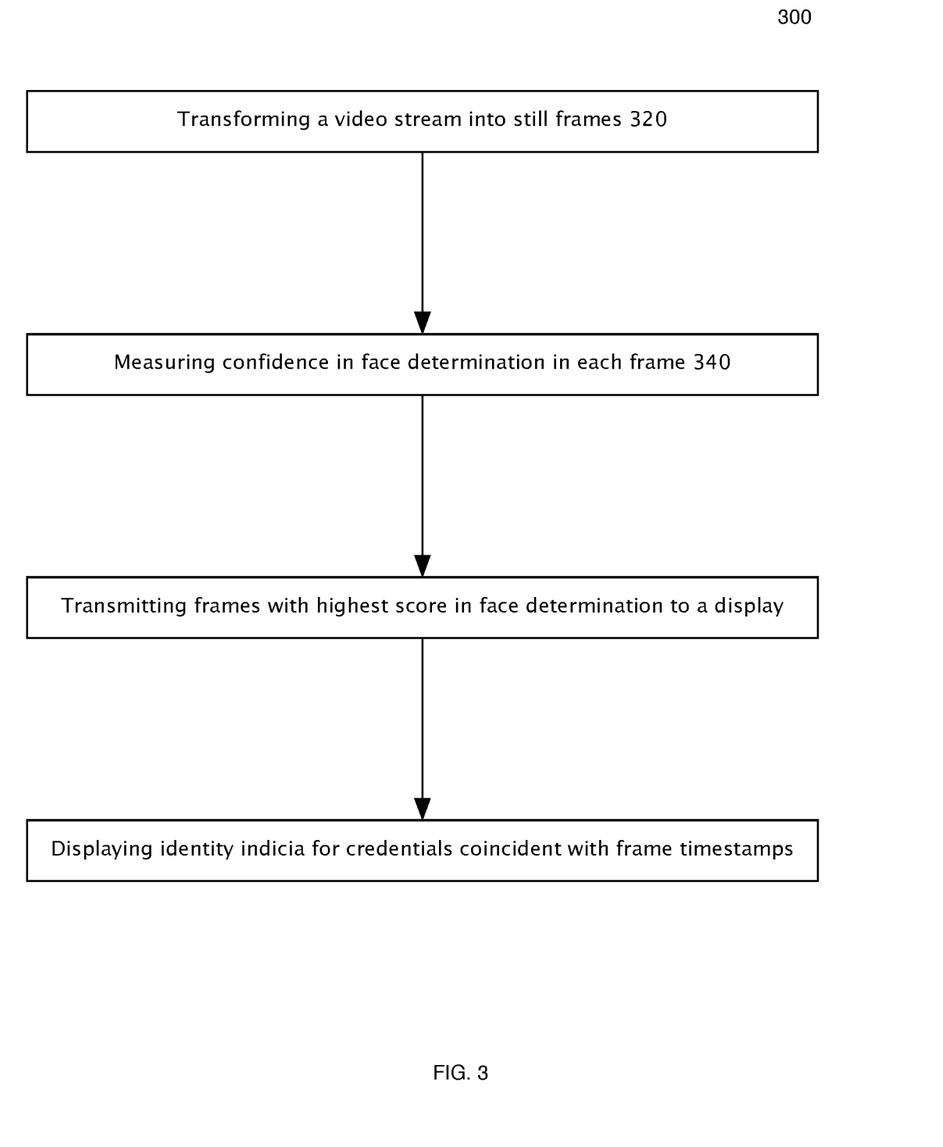
FIG. 3 is a flow chart illustrating an exemplary methodology that matches video still frames with identity indicia in accordance with an aspect of the subject invention.

Referring now to FIG. 3, there is a flow diagram of an exemplary process 300 that facilitates matching video still frames with identity indicia.

Video still frames with highest facial detection scores as provided by any one of well-known facial determination analysis services are matched and displayed to a security operator console with identity indicia retrieved upon a credential event. The processes 300 include: transforming a video stream into still frames 320; measuring confidence in face determination in each frame 340; transmitting frames with highest score in face determination to a display console 360; and displaying identity indicia for credentials coincident with frame timestamps 380.

A video surveillance stream is functionally equivalent to a continuous sequence of still frames at discrete time stamps.

Figure 4:
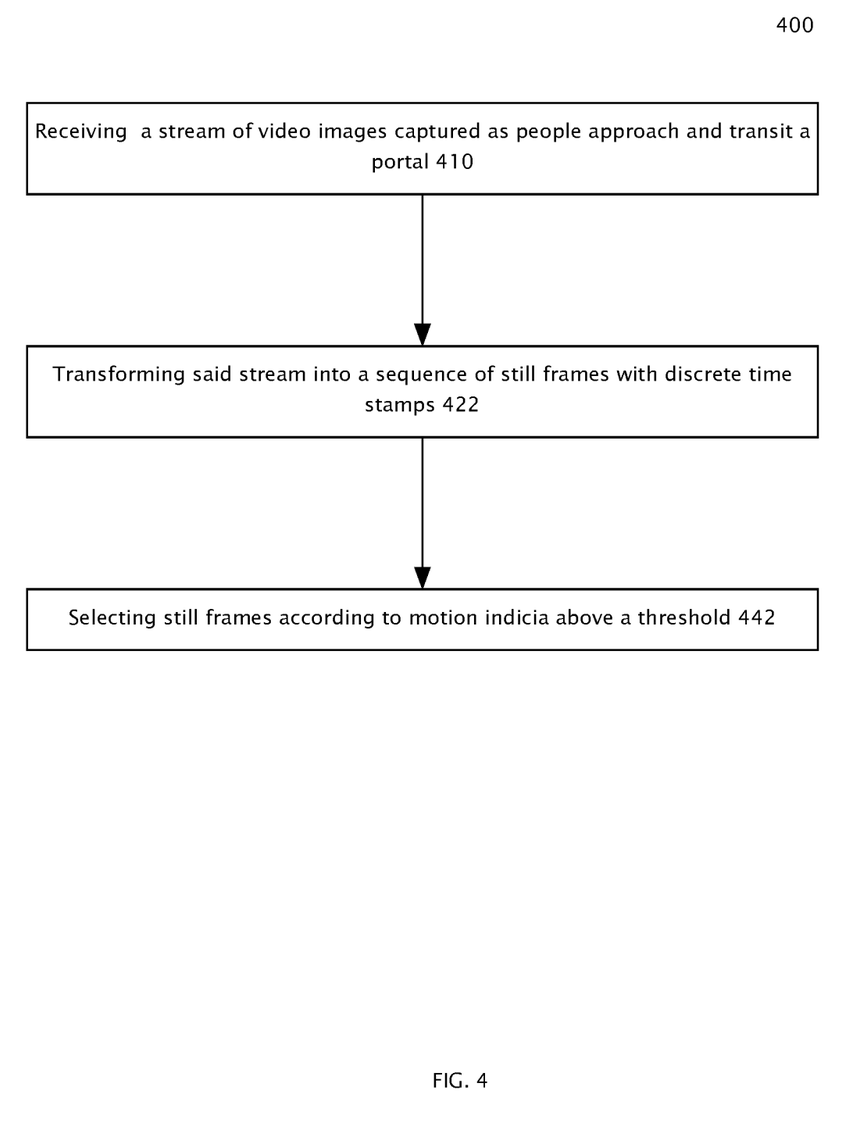
FIG. 4 is a flow chart illustrating an exemplary methodology that compresses video stream into the most useful elements to reduce unnecessary operator's viewing time in accordance with an aspect of the subject invention.

Referring now to FIG. 4, there is a flow diagram of an exemplary process 400 that facilitates compressing this stream into the most useful elements to reduce viewing time including: receiving a stream of video images captured as people approach and transit a portal 410; transforming said stream into a sequence of still frames with discrete time stamps 422; and selecting still frames according to motion indicia above a threshold 442.

Figure 5:
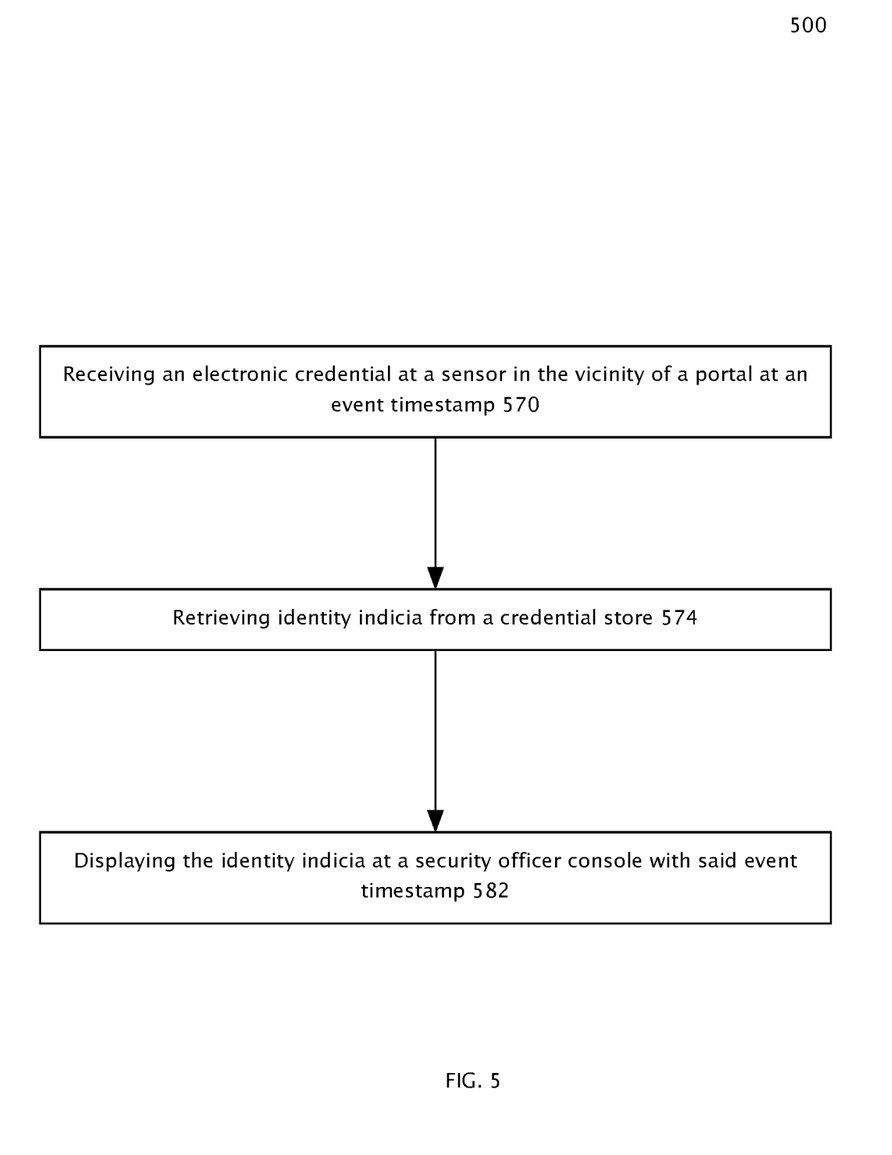
FIG. 5 is a flow chart illustrating an exemplary methodology that receives credentials and displays identity indicia in accordance with an aspect of the subject invention.

When a credential bearer submits an electronic credential to transit a portal, identity indicia is retrieved and presented to a security officer console. Referring now to FIG. 5, there is a flow diagram of an exemplary process 500 that facilitates receiving credentials and displaying identity indicia, including: receiving an electronic credential at a sensor in the vicinity of a portal at an event timestamp 570; retrieving identity indicia from a credential store 574; and displaying the identity indicia at a security officer console with said event timestamp 582.

Figure 6:
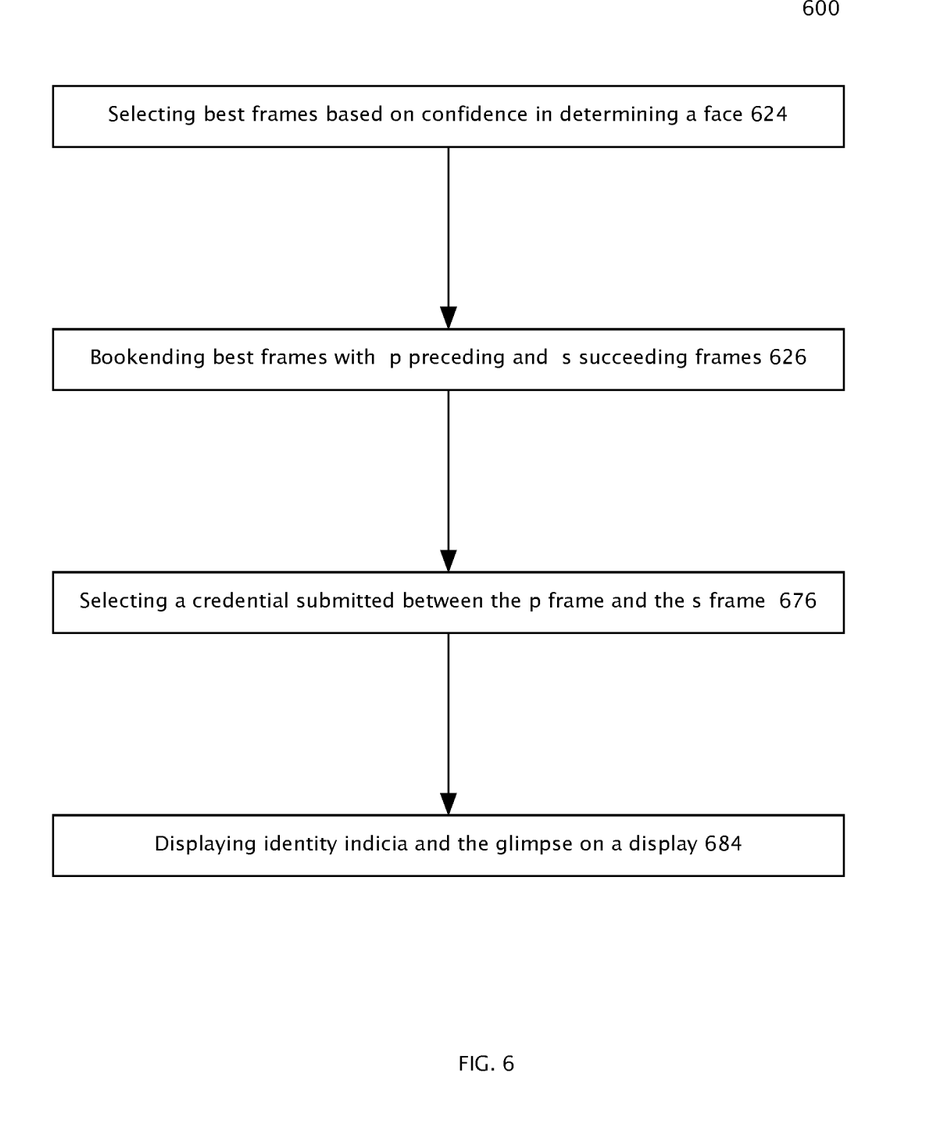
FIG. 6 is a flow chart illustrating an exemplary methodology that augments identity indicia with a video clips captured asynchronously in accordance with an aspect of the subject invention.

A video clip containing one or more frames with highest facial detection score of all frames captured in propinquity to the time of credential submission, is matched to and displayed with the identity indicia. One embodiment is to find the best quality face frame, determine its time indicia in the stream, and then locate the nearest credential submittal timestamp. Referring now to FIG. 6, there is a flow diagram of an exemplary process 600 that facilitates augmenting identity indicia with a video clip captured asynchronously: selecting best quality frames based on confidence in determining a face 624; bookending each best quality frame with l leading frames and s succeeding frames 626; selecting a credential submitted between the l frame and the s frame 676; and displaying identity indicia and the clip on a display 684.

Credentials from a group of people entering together are presented to a security officer console along with video clips simultaneously containing a plurality of faces or perspectives which may be accepted en masse or in part.

Figure 7:
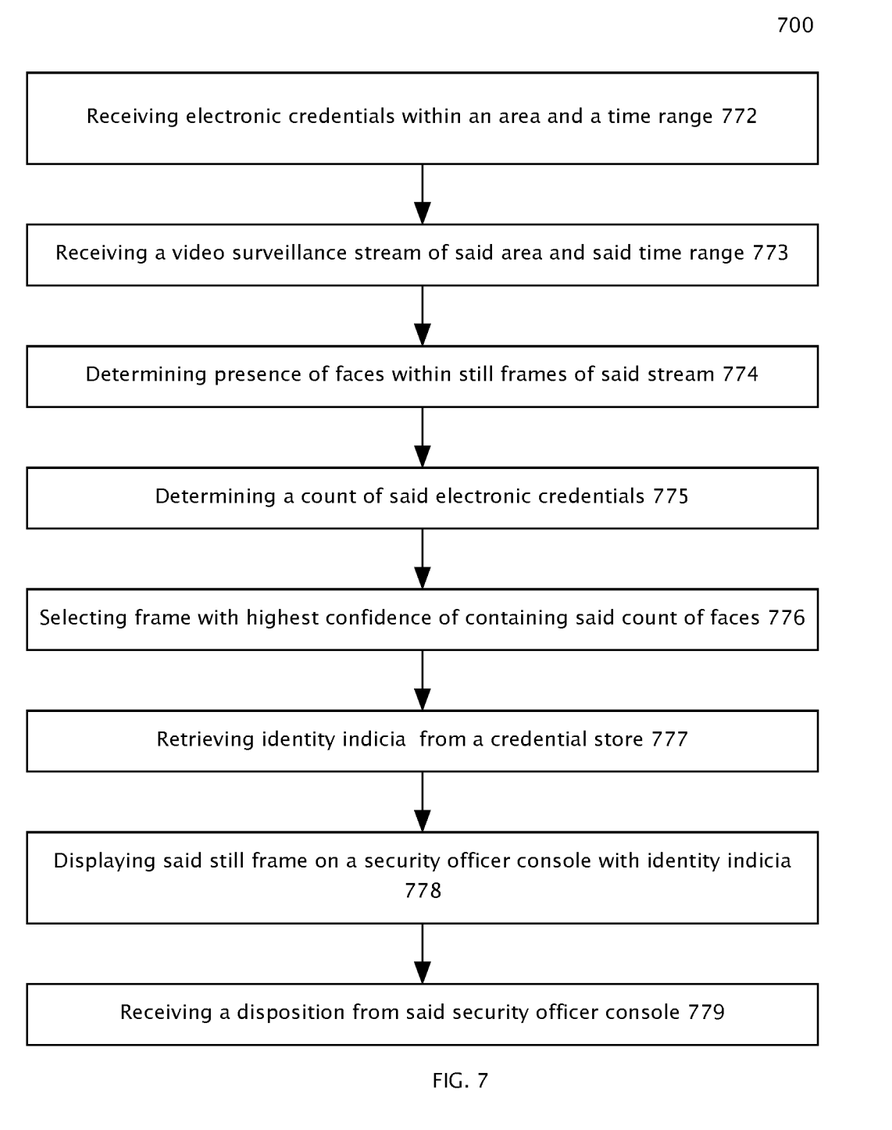
FIG. 7 is a flow chart illustrating an exemplary methodology that matches many credentials to many faces in accordance with an aspect of the subject invention.

Rather than forming single files to pass through a portal, groups of individuals, each bearing his or her own credential may transit a lobby or hallway with remote sensors capable of reading an electronic credential within a volume of space. Referring now to FIG. 7, there is a flow diagram of an exemplary process 700 that facilitates matching many credentials to many faces by: receiving a plurality of electronic credentials within an area and a time range 772, receiving a video surveillance stream of said area and said time range 773, determining presence of faces within still frames of said stream 774; determining a count of said electronic credentials 775; selecting a still frame with highest confidence of containing said count of faces 776; displaying said still frame on a security officer console with identity indicia retrieved from a credential store 777-778; and receiving a disposition from said security officer console 779.

Time shifting still frames to reconcile with credential submission time stamps increases productivity of display console users.

Because the submission of an electronic credential may involve holding a device in the vicinity of a reading device, a video surveillance camera may not capture the best quality face at that instant. The highest score for confidence level of finding a face may be in a frame captured earlier or later than the timestamp of credential submission. Thus, frames both earlier and later than access control or transiting the portal may be better for a security officer.

Figure 8:
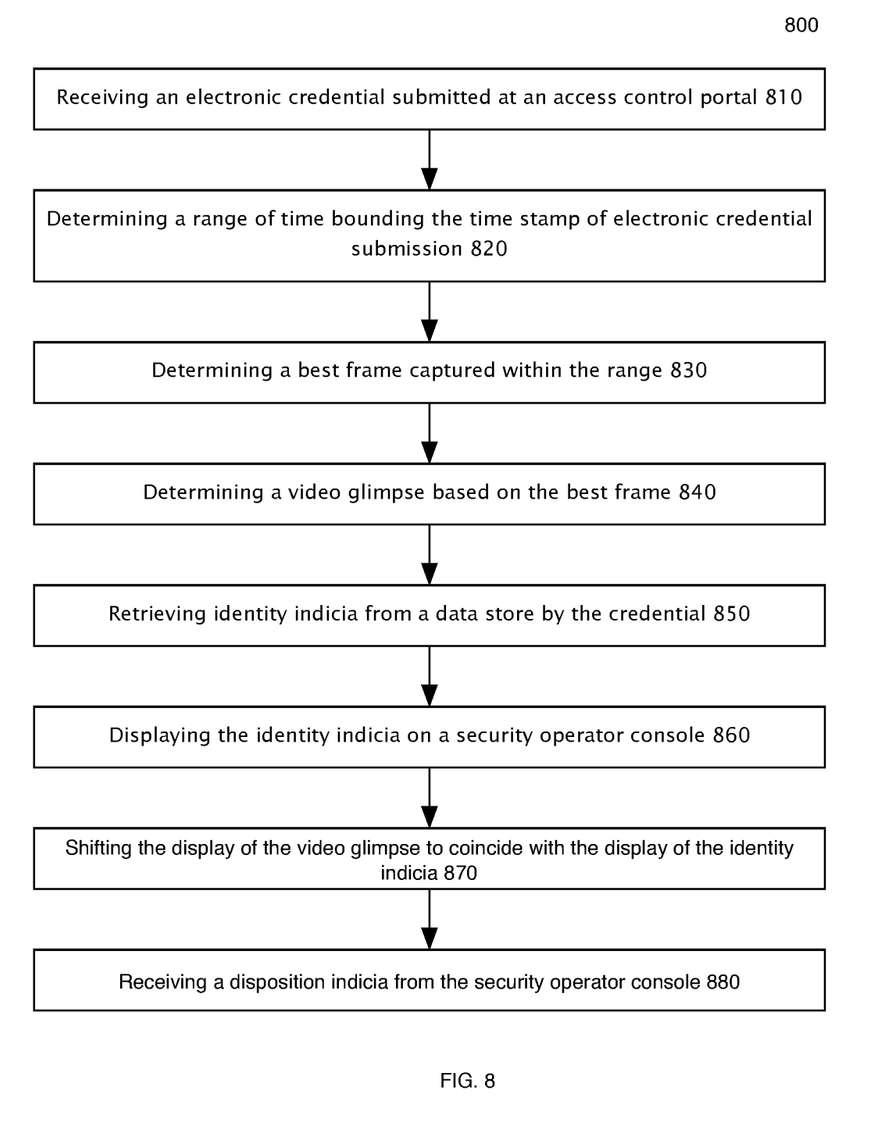
FIG. 8 is a flow chart illustrating an exemplary methodology that time shifts credential submission or image capture in accordance with an aspect of the subject invention.

Referring now to FIG. 8, there is a flow diagram of an exemplary process 800 that facilitates time shifting credential submission or image capture by: receiving an electronic credential submitted at an access control portal 810, determining a range of time bounding the time stamp of electronic credential submission 820, determining a best quality frame captured within the range 830, determining a video clip based on the best quality frame 840, retrieving identity indicia from a data store by the credential 850, displaying the identity indicia on a security operator console 860, shifting the display of the video clip to coincide with the display of the identity indicia 870, and receiving a disposition indicia from the security operator console 880.

Figure 9:
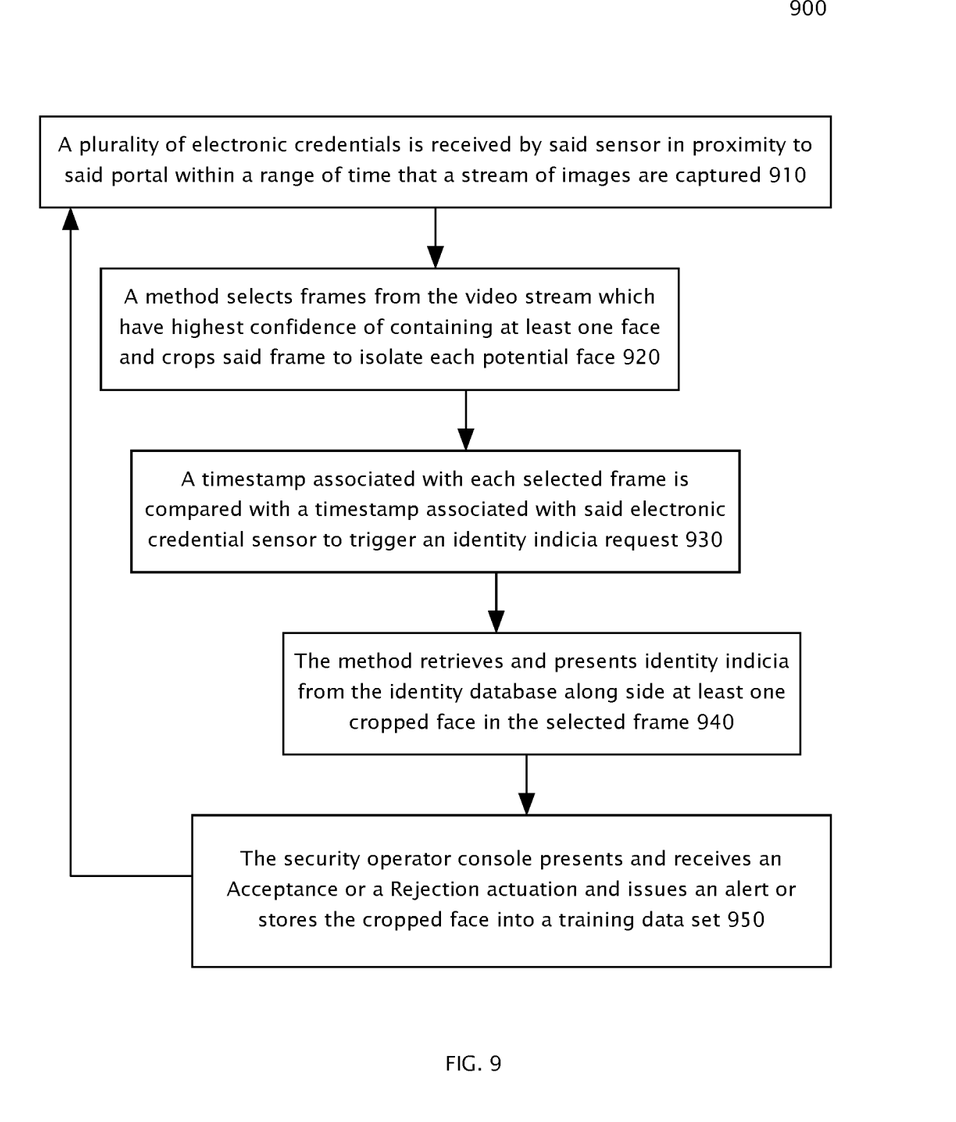
FIG. 9 discloses the major architecture of the invention as a block diagram of functions.

The apparatus controls and performs as follows and shown in FIG. 9. A plurality of electronic credentials is received by said sensor in proximity to said portal within a range of time that a first stream of images is captured 910. A method selects frames from the video stream which have highest confidence of containing at least one face and crops said frame to isolate each potential face 920. A timestamp associated with each selected frame is compared with a timestamp associated with said electronic credential sensor to trigger an identity indicia request 930. The method retrieves and presents identity indicia from the identity database along side, above, or below at least one cropped face in the selected frame 940. The security operator console presents and receives an Acceptance or a Rejection actuation and issues an alert or stores the cropped face into a training data set 950.

Having accumulated best faces for each credential over time, the method enables synthesis of a face from the training data set and update the identity database with an evolving indicia.

Given a first plurality of electronic credentials within a range of time and a plurality of video streams of surveillance images captured substantially within said range of time, the method enables a processor under instructions stored in non-transitory media to Find at least one face in each frame of said video streams; Crop each frame to isolate at least one face; Select the frames with highest confidence level of containing a face; Select electronic credential(s) captured in closest time proximity to selected frames; Display to security console both previous stored facial image associated with electronic credential and at least one cropped face in selected surveillance frame for accept (default) and reject (action); and Store latest accepted cropped face into training data set.

One can appreciate the innovation in providing a security operator console with the single best quality facial image captured by surveillance camera for each electronic credential received at a portal.

CONCLUSION

The object of the invention is to increase the accuracy and productivity of security operators of display consoles responsible for physical access control. Rather than simply trusting that the electronic credentials have not been lost, misplaced or stolen, the security operator in enabled to view both a face captured in a surveillance video camera as well as the identity indicia even though the credential submittal and the video capture are performed asynchronously. The system enables an alert initiation passively or actively.

The invention can be easily distinguished from facial recognition products.

The invention can be easily distinguished from viewing unimproved real time or stored video streams by the process of determining best quality frame with highest confidence of finding a face and synchronizing it with the display of the identity indicia associated with the electronic credential.

The invention is distinguished by receiving at least one video stream and a plurality of electronic credentials substantially within a range of time.

The invention is distinguished by finding at least one video frame in the stream with highest confidence level of containing a face and cropping each found frame to isolate at least one face.

The invention is distinguished by selecting an electronic credential captured in closest time proximity to selected frames.

The invention is distinguished by retrieving identity indicia from an identity database for the selected electronic credential.

The invention is distinguished by displaying to a security console at least one cropped face and a previously stored facial image associated with the electronic credential.

The invention is distinguished by one of storing the cropped face upon Acceptance by a security operator and transmitting an Alert upon Rejection by the security operator.

The invention is easily distinguished by presentation of frames leading and succeeding the best quality frame effecting a stop motion animation.

An Exemplary Suitable Operating Environment: Computing Device

Figure 1:
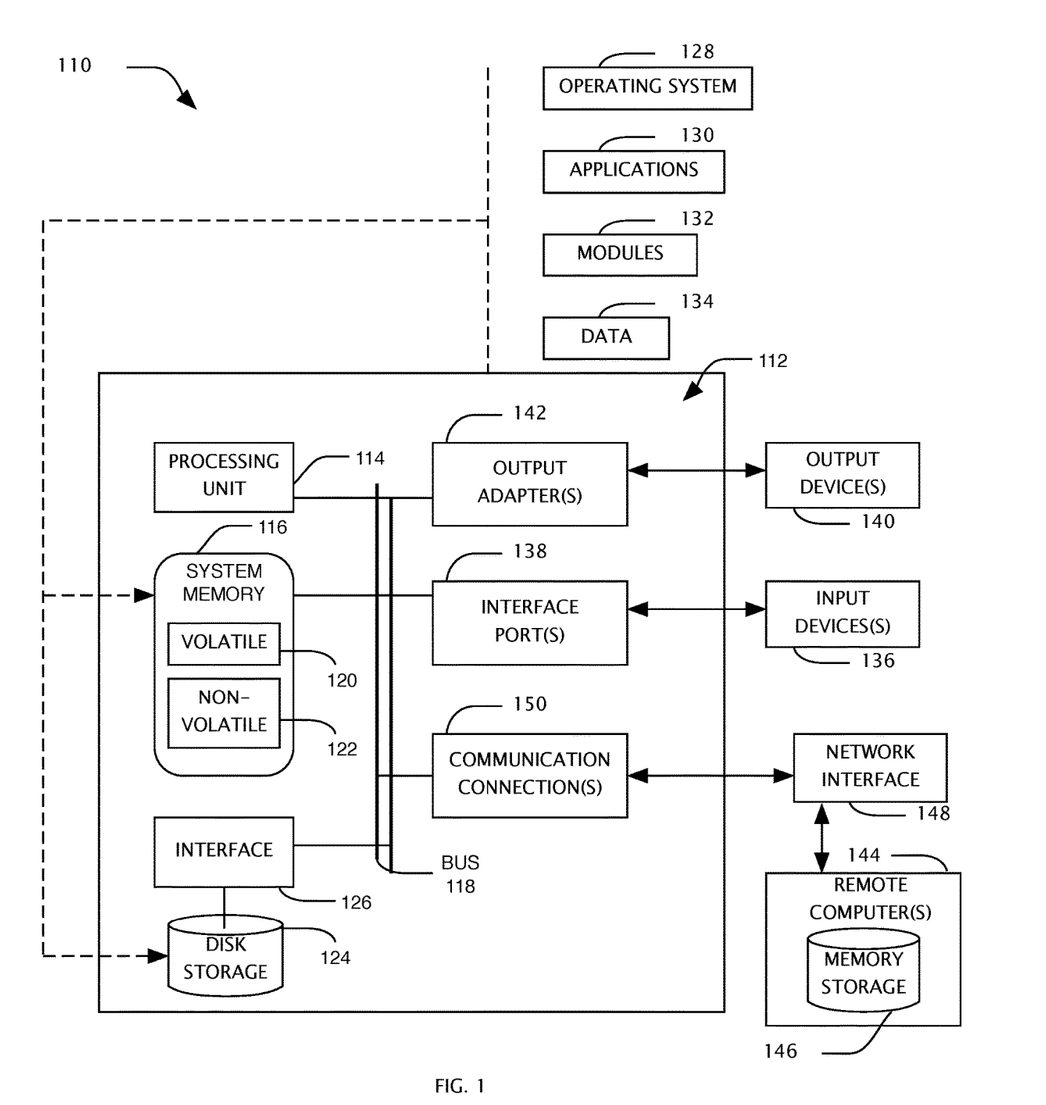
FIG. 1 illustrates an exemplary environment for implementing various aspects of the invention.

In order to provide additional context for various aspects of the subject invention, FIG. 1 and the following discussion are intended to provide a brief, general description of a suitable operating environment 110 in which various aspects of the subject invention may be implemented. While the invention is described in the general context of computer-executable instructions, such as program modules, executed by one or more computers, processors, or other devices, those skilled in the art will recognize that the invention can also be implemented in combination with other circuits, program modules, and/or as a combination of hardware and software.

Generally, however, program modules include routines, programs, objects, components, data structures, etc. that perform particular tasks or implement particular data types. The operating environment 110 is only one example of a suitable operating environment and is not intended to suggest any limitation as to the scope of use or functionality of the invention. Other well known computer systems, environments, and/or configurations that may be suitable for use with the invention include but are not limited to, mobile phones, tablets, cloud servers, gaming devices, displays, identity credentials and their readers, cameras, attire, vehicles, medical devices, watches, robots, security instruments, weapons systems, entertainment devices, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 1, an exemplary environment 110 for implementing various aspects of the invention includes a computer 112. The computer 112 includes a processing unit 114, a system memory 116, and a system bus 118. The system bus 118 couples system components including, but not limited to, the system memory 116 to the processing unit 114. The processing unit 114 can be any of various available processors. Dual microprocessors and multi-core architectures also can be employed as the processing unit 114. Within this application the term "processor" also refers to implementations of 112 in highly integrated embodiments.

The system bus 118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 116 includes volatile memory 120 and nonvolatile memory 122. The basic input/output system (BIOS), containing the basic routines to transfer information between elements within the computer 112, such as during start-up, is stored in nonvolatile memory 122. By way of illustration, and not limitation, nonvolatile memory 122 can include read only memory (ROM), programmable ROM (PROM), electrically programmable ROM (EPROM), electrically erasable ROM (EEPROM), or flash memory. Volatile memory 120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 112 also includes removable/nonremovable, volatile/nonvolatile computer storage media. FIG. 1 illustrates, for example a disk storage 124. Disk storage 124 includes, but is not limited to, devices like a magnetic disk drive, floppy disk drive, solid state drive, flash memory card, or memory stick. In addition, disk storage 124 can include storage media separately or in combination with other storage media including, but not limited to, network storage, array of disks, or quantum storage. To facilitate connection of the disk storage devices 124 to the system bus 118, a removable or non-removable interface is typically used such as interface 126.

It is to be appreciated that FIG. 1 describes software that acts as an intermediary between users and the basic computer resources described in suitable operating environment 110. Such software includes an operating system 128. Operating system 128, which can be stored on non-transitory media such as disk storage 124, acts to control and allocate resources of the computer system 112. System applications 130 take advantage of the management of resources by operating system 128 through program modules 132 and program data 134 stored either in system memory 116 or on disk storage 124. It is to be appreciated that the subject invention can be implemented with various operating systems or combinations of operating systems, virtual machines, and virtual machine images.

A user enters commands or information into the computer 112 through input device(s) 136. Input devices 136 include, but are not limited to, a radio, magnetic, or optical scanner, a pointing device such as, mouse, trackball, stylus, touch pad, keyboard, microphone, joystick, game pad, satellite dish, scanner, TV tuner card, digital camera, digital video camera, web camera, and the like. These and other input devices connect to the processing unit 114 through the system bus 118 via interface port(s) 138. Interface port(s) 138 include, for example, HDMI, a serial port, a parallel port, a game port, and a universal serial bus (USB). Output device(s) 140 use some of the same type of ports as input device(s) 136. Thus, for example, a USB port may be used to provide input to computer 112, and to output information from computer 112 to an output device 140. Output adapter 142 is provided to illustrate that there are some output devices 140 like High Definition Televisions (HDTV), monitors, speakers, and printers among other output devices 140 that require special adapters. The output adapters 142 include, by way of illustration and not limitation, video and sound cards that provide a means of connection between the output device 140 and the system bus 118. It should be noted that other devices and/or systems of devices provide both input and output capabilities such as remote computer(s) 144.

Computer 112 can operate in a networked environment using logical connections to one or more remote computers, such as remote computer(s) 144. The remote computer(s) 144 can be a cloud service, personal computer, a server, a router, a network PC, a workstation, a microprocessor based appliance, a peer device or other common network node and the like, and typically includes many or all of the elements described relative to computer 112. For purposes of brevity, only a memory storage device 146 is illustrated with remote computer(s) 144. Remote computer(s) 144 is logically connected to computer 112 through a network interface 148 and then physically connected via communication connection 150. Network interface 148 encompasses communication networks such as cellular data, Wi-Fi, Bluetooth, Near Field Communications, local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, mesh, IP, point-to-point links, circuit switching networks like Integrated Services Digital Networks (ISDN) and variations thereon, packet switching networks, and Digital Subscriber Lines (DSL).

Communication connection(s) 150 refers to the hardware/software employed to connect the network interface 148 to the bus 118. While communication connection 150 is shown for illustrative clarity inside computer 112, it can also be external to computer 112. The hardware/software necessary for connection to the network interface 148 includes, for exemplary purposes only, internal and external technologies such as, modems including satellite, 802.11, CDMA, regular telephone grade modems, cable modems and DSL modems, ISDN adapters, and Ethernet cards.

SPIRIT AND SCOPE OF THE APPENDED CLAIMS

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for transformation of a video surveillance stream to augment a physical access control portal console, the method comprising:
   receiving a stream of video images captured as people approach and transit a portal;
   transforming said stream into a sequence of still frames with discrete time stamps;
   selecting still frames according to motion indicia above a threshold; and,
   selecting still frames according to a confidence score of face determination;
   receiving an electronic credential at a sensor in the vicinity of a portal at an event timestamp;
   retrieving identity indicia from a credential store;
   determining a video clip of bearers of said electronic credential; and
   displaying the identity indicia at a security officer console with said event timestamp with said video clip of bearers of said electronic credential;
   wherein determining a video clip comprises process steps:
   receiving a video stream from surveillance cameras at a portal;
   selecting best quality frames based on confidence in determining a face;
   bookending best quality frames with l leading and s succeeding frames;
   selecting a credential submitted between the l frame and the s frame; and
   storing said identity indicia and the clip into non-transitory media.

2. A method for transforming a cohort of electronic credentials submitted at a physical access control portal and a video stream, the method comprising:

receiving a plurality of electronic credentials within an area and a time range;

receiving a video surveillance stream of said area and said time range;

determining a confidence score of face determination within each still frame of said stream;

determining a count of said electronic credentials;

selecting a still frame with highest confidence of containing said count of faces;

displaying said still frame on a security officer console with identity indicia retrieved from a credential store; and receiving a disposition from said security officer console, whereby time shifting still frames to reconcile with credential submission time stamps, provides compacted viewing time to increase productivity of display console users.

3. The method of claim 2 for transformation of a video stream and an electronic credential into a console operator interface by causing a processor to perform instructions encoded in non-transitory media, the method further comprising:

receiving an electronic credential submitted to a sensor at an access control portal; selecting a range of time bounding the time stamp of electronic credential submission;

determining a best quality frame captured within the range by scoring confidence level of face determination among a plurality of frames;

determining a video clip based on the best quality frame;

retrieving identity indicia from a data store by the credential;

displaying the identity indicia on a security operator console and time stamp of credential submission;

time shifting the display of the video clip to coincide with the display of the identity indicia; and receiving a disposition indicia from the security operator console.

* * * * *